(No Model.)
E. A. HARTSELL
COFFEE ROASTER.
No. 254,547. Patented Mar. 7, 1882.
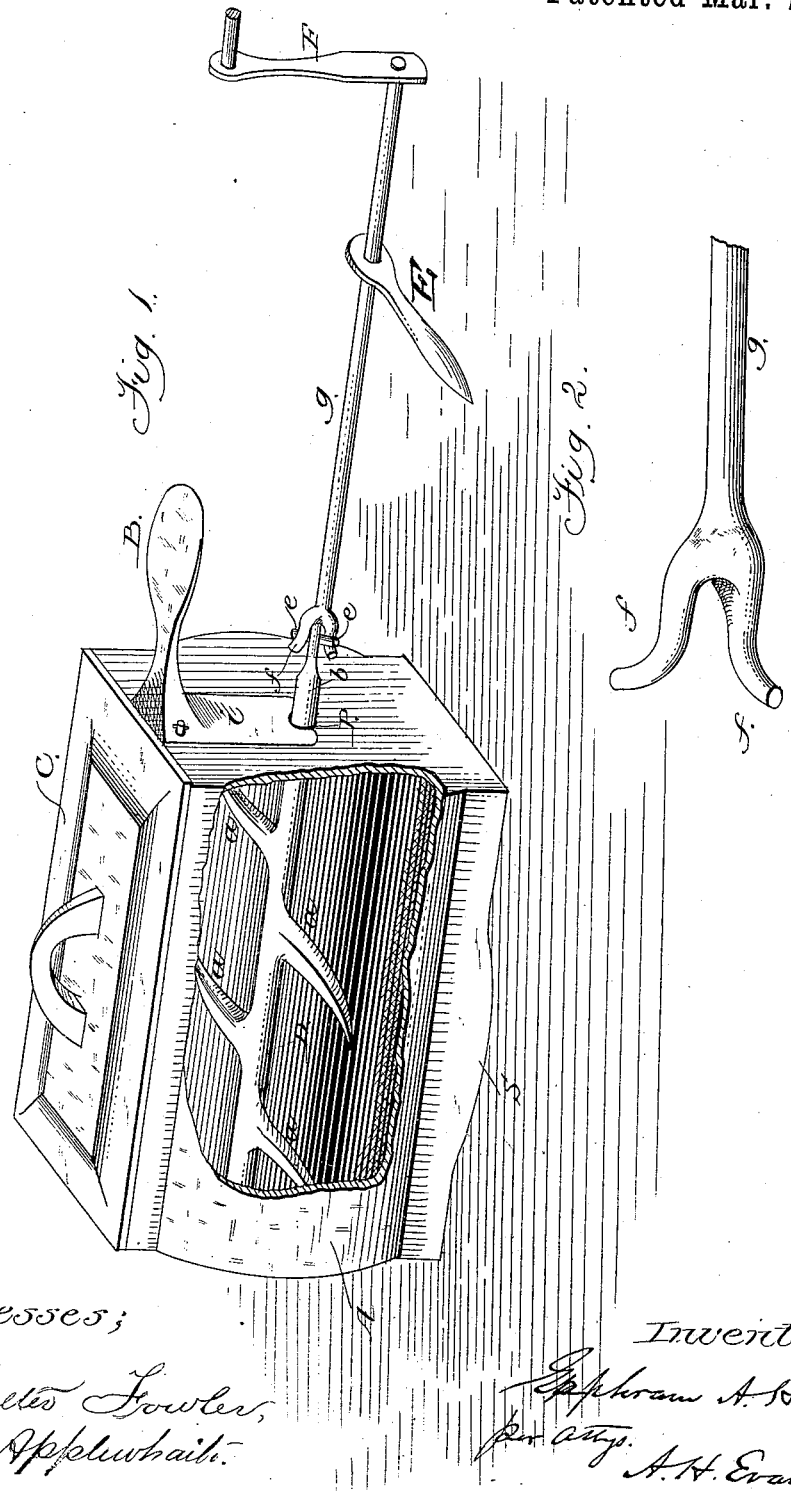
Witnesses:
J. Walter Fowler,
H. B. Applewhaite.
Inventor:
Ephraim A. Hartsell
per atty.
A. H. Evans &co

United States Patent Office.

EAPHRAM A. HARTSELL, OF BIG LICK, NORTH CAROLINA.

COFFEE-ROASTER.

SPECIFICATION forming part of Letters Patent No. 254,547, dated March 7, 1882.

Application filed September 6, 1881. (No model.)

*To all whom it may concern:*

Be it known that I, EAPHRAM A. HARTSELL, of Big Lick, in the county of Stanley and State of North Carolina, have invented certain Improvements in Coffee-Roasters; and I hereby declare the following to be a full, clear, and exact description thereof, reference being had to the accompanying drawings, making part of this specification, in which—

Figure 1 is a perspective view of the machine, with a portion of the side broken away to show the stirrers. Fig. 2 is an enlarged view, showing the connection of the removable crank with the stirrer-shaft.

The object of my invention is to provide a coffee-roaster in which the coffee can be easily stirred without a close approach to the fire, and from which the stirrers are easily removable.

My invention consists in a coffee-receptacle made with spreading flanges to cover the stove-hole, open at the top, and provided at its end with a slot, into which slides the removable stirrer-shaft, in combination with a handle cast with a plate on it, to cover the slot in the end of the receptacle when keyed or bolted to it.

My invention also consists in a removable crank-shaft, provided at its outer end with a crank and supporting holding-bar and at its inner end with two spiral prongs, in combination with the projection of the stirrer-shaft, provided with two lugs or pins to engage said prongs, as hereinafter more specifically described and claimed.

In order that those skilled in the art may make and use my invention, I will proceed to describe the manner in which I have carried it out.

In the said drawings, A represents the body of the roaster, which is cast or otherwise constructed with flanges S S to cover the stove-hole, and open at the top, which is provided with a cover. Stirrer-arms $a\ a$, arranged on a shaft, D, serve to agitate the coffee, the shaft fitting into a socket at one end of the body of the roaster and resting in the bottom of a slot, P, at the other end, and leaving a projecting portion, $b$, provided with two projecting pins or lugs, $e\ e$, for a purpose hereinafter described.

Bolted or otherwise fastened to the end of receptacle A is a plate, $i$, covering the slot P, and cast with a handle, projecting as seen at B. The cover C is of such length as to cover the upper edge opening of the slot.

The stirrers are revolved by a rod, $g$, provided with a crank, F, and hand-support E at one end and two twisted prongs, $f\ f$, at the other end. These prongs engage on opposite sides of opposite lugs or pins $e\ e$, and turn the shaft D when the crank F is turned from left to right. When it is desired to disconnect the turning mechanism from the stirrer a reverse turn of shaft F will throw the prongs off of pins $e\ e$.

Thus I am enabled to produce a cheap and efficient roaster, and one which can be stirred without a near approach to the fire, and producing an article of roasted coffee equal to the best on the market.

Having thus described my invention, what I claim as new, and desire to secure by Letters Patent, is—

1. In a coffee-roaster, the receptacle A, provided with the flanges S S and the slot P, in combination with a plate, $i$, cast integral with the handle B and fastened to the receptacle over the slot P, substantially as set forth.

2. The coffee-roaster A and its stirrer-shaft D, provided with a projecting end, $b$, and lugs $e\ e$, in combination with shaft $g$, provided with the twisted prongs $f\ f$, holding-support E, and crank F, all constructed, arranged, and operated as set forth.

EAPHRAM ALEX. HARTSELL.

Witnesses:
S. A. MORTON,
A. W. DRY.